(12) United States Patent
Williams, Jr. et al.

(10) Patent No.: US 8,678,421 B1
(45) Date of Patent: Mar. 25, 2014

(54) ARTICULATING HITCH APPARATUS FOR VEHICLES

(71) Applicant: Williams Innovations, LLC, Morrisville, NC (US)

(72) Inventors: Thomas M. Williams, Jr., Durham, NC (US); William David Woolf, Durham, NC (US)

(73) Assignee: TeleSwivel, LLC, Durham, NC (US)

( * ) Notice: Subject to any disclaimer, the term of this patent is extended or adjusted under 35 U.S.C. 154(b) by 0 days.

(21) Appl. No.: 13/646,355

(22) Filed: Oct. 5, 2012

(51) Int. Cl.
 *B60D 1/155* (2006.01)
(52) U.S. Cl.
 USPC ..................................... 280/479.1
(58) Field of Classification Search
 USPC .............. 280/478.1, 479.1, 479.2, 479.3, 495
 See application file for complete search history.

(56) References Cited

U.S. PATENT DOCUMENTS

| | | | | | |
|---|---|---|---|---|---|
| 4,153,132 | A | * | 5/1979 | Biedebach | 180/420 |
| 5,009,446 | A | * | 4/1991 | Davis | 280/479.2 |
| 5,236,214 | A | * | 8/1993 | Taylor | 280/402 |
| 6,871,868 | B2 | * | 3/2005 | Pogue | 280/479.1 |
| 6,974,146 | B2 | * | 12/2005 | Abair | 280/470 |

\* cited by examiner

*Primary Examiner* — Kevin Hurley
(74) *Attorney, Agent, or Firm* — Myers Bigel Sibley & Sajovec, P.A.

(57) ABSTRACT

A hitch apparatus includes a frame configured to be secured to a vehicle and that is pivotable about a first axis, a guide that is movably secured to the frame and pivotable about a second axis substantially transverse to the first axis, and a tow bar movably secured to the guide and movable relative to the guide between retracted and extended positions. The hitch apparatus includes a user controlled positioning system with a user input device that is configured to allow a user to extend and retract the tow bar and to articulate the tow bar up-down and left-right so as to position the tow bar distal end at a desired position within a three-dimensional coordinate system.

36 Claims, 9 Drawing Sheets

ARTICULATING HITCH APPARATUS FOR VEHICLES

FIELD OF THE INVENTION

The present invention relates generally to vehicle towing and, more particularly, to towing apparatus.

BACKGROUND

Powered and trailed vehicles are conventionally interconnected for travel by coupling hitches involving fixed locations on the vehicles. Using ball and socket-type universal connections or pin-type connections, the required relative movement during travel is provided. The fixed locations, however, may be difficult to effect, particularly with large vehicles that prevent ready manual alignment for final coupling. When accurate alignment is not obtained, conventionally the towed vehicle is manually moved to proper position, which may require strength, dexterity and multiple personnel, often with an attendant risk of injury. As the tongue weight of a towed vehicle increases, the skill required and risk associated with coupling the towed vehicle to a towing vehicle may be substantially increased. The problem may be particularly troublesome for large steerable wheel trailers, such as those employed by the military.

Telescoping and pivoting hitches have been proposed to allow coupling between misaligned vehicles. Most are designed for lighter weight trailers and unsuited for heavy load applications. Others provide only a length-dependent articulation reducing the accommodated zone of vehicle misalignment.

SUMMARY

It should be appreciated that this Summary is provided to introduce a selection of concepts in a simplified form, the concepts being further described-below in the Detailed Description. This Summary is not intended to identify key features or essential features of this disclosure, nor is it intended to limit the scope of the invention.

According to some embodiments of the present invention, a hitch apparatus includes a frame that is configured to be movably secured to a vehicle so as to be pivotable about a first axis, a guide that is movably secured to the frame and pivotable about a second axis that is substantially transverse to the first axis, and a tow bar that is movably secured to the guide and movable relative to the guide between retracted and extended positions. The hitch apparatus provides a large connection target area and also provides impact-free tow bar retraction and locking.

In some embodiments of the present invention, the distal end of the tow bar is configured to removably receive a coupling apparatus, such as a ball coupler, a pintle hook, a cushioned pintle hook, a swivel pintle hook, a lunette ring, a clevis pin attachment, etc. In other embodiments of the present invention, a coupling apparatus such as a ball coupler, a pintle hook, a cushioned pintle hook, a swivel pintle hook, a lunette ring, a clevis pin attachment, etc., may be permanently secured the distal end of the tow bar. In some embodiments of the present invention, the hitch apparatus also includes a locking mechanism that is operably secured to the frame and that releasably engages the tow bar to maintain the tow bar in a retracted position.

The hitch apparatus includes a user controlled positioning system that is configured to allow a user to extend and retract the tow bar and to articulate the tow bar up-down and left-right so as to position the tow bar distal end at a desired position within a three-dimensional coordinate system. The positioning system includes at least one first actuator configured to pivot the frame about the first axis, a second actuator configured to pivot the guide about the second axis, and a third actuator configured to extend and retract the tow bar relative to the guide. The actuators may be hydraulic actuators, electrical actuators, pneumatic actuators, etc. In some embodiments, there may be various combinations of types of actuators. The positioning system also includes a user input device that allows a user to operate the at least one first actuator to pivot the frame about the first axis, operate the second actuator to pivot the guide about the second axis, and operate the third actuator to extend and retract the tow bar relative to the guide.

In some embodiments of the present invention, the frame has opposite first and second end portions, and the frame first end portion is configured to be pivotably secured to a vehicle. The at least one first actuator is configured to pivot the frame second end portion about the first axis such that the tow bar distal end can be raised and lowered vertically. The second actuator is configured to pivot the guide and tow bar about the second axis such that the tow bar distal end can be swiveled back and forth horizontally. The third actuator is operably associated with the guide and is configured to extend and retract the tow bar relative to the guide. In some embodiments, the guide is an elongated tube and the third actuator is positioned within the tube.

In some embodiments of the present invention, the positioning system includes a user interface that is configured to display a representation of a location of the distal end of the tow bar relative to a towed vehicle, trailer tongue, etc. In other embodiments of the present invention, the positioning system includes a video camera, or is operably associated with a vehicle backup camera, for capturing video images, wherein the video camera has a field of view that at least encompasses the distal end of the tow bar, and a video display operable to display video images captured by the video camera.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

DETAILED DESCRIPTION

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment of figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "vehicle" includes all types of vehicles including, but not limited to, automobiles, trucks, military vehicles, airplanes, trains, etc., and also includes towed vehicles and towing vehicles.

Referring now to FIGS. 1-10 and 11A-11C, a hitch apparatus 10, according to some embodiments of the present invention, is illustrated. The hitch apparatus 10 is configured to be installed on a vehicle V and, in some embodiments, is mounted to a frame and/or underside of a vehicle (collectively referred to herein as a "vehicle chassis"). Embodiments of the present invention are not limited to being attached to a vehicle in any particular manner.

The hitch apparatus 10 includes a frame 12 that is configured to be pivotably secured to a vehicle and that is pivotable about a first axis $A_1$ (FIG. 5), a guide 20 that is movably secured to the frame 12 and pivotable about a second axis $A_2$ (FIGS. 9, 10) that is substantially transverse to the first axis $A_1$, and a tow bar 30 that is movably secured to the guide 20 and movable relative to the guide 20 between retracted and extended positions. The illustrated frame 12 includes an upper portion 12a and a lower portion 12b. The lower portion 12b of the illustrated frame 12 is configured to be secured to a vehicle chassis, for example via fasteners and/or welding. In some embodiments of the present invention, the frame lower portion 12b represents a part of a vehicle chassis. In other words, the hitch apparatus 10 may only utilize the frame upper portion 12a, which is secured to a vehicle chassis. As such, in some embodiments of the present invention, as illustrated in FIGS. 11A-11C, the frame lower portion 12b may not be required because the frame upper portion 12a is pivotably secured to a vehicle chassis.

In some embodiments of the present invention, the frame 12 may be configured to have an adjustable width that expands/contracts to fit various chassis widths of various types of vehicles.

The illustrated frame upper portion 12a includes a plurality of members 12m secured together, for example via fasteners and/or welding, that support the guide 20 and that provide structural rigidity to the hitch apparatus 10. The illustrated upper frame members 12m are tubular members. However, embodiments of the present invention are not limited to the use of tubular members. Frame members 12m may have various shapes and configurations, without limitation. For example, in some embodiments, one or more of the frame members 12m may be a solid member or plate. Moreover, the frame upper portion 12a can have various shapes and configurations and is not limited to the illustrated number or arrangement of members 12m.

The illustrated frame upper portion 12a also includes a pair of spaced-apart stops 12s that limit an extent to which the guide 20 can pivot about the second axis $A_2$.

The various components of the hitch apparatus 10, i.e., the frame 12, the guide 20, and the tow bar 30 can be formed from various materials known to those skilled in the art. An exemplary material for one or more of the hitch apparatus components includes, but is not limited to, case-hardened steel.

The illustrated guide 20 is an elongated tubular member having opposite proximal and distal end portions 20a, 20b connected by a center or medial portion 20c. The guide proximal end 20a is pivotably secured to the frame upper portion 12a, for example via a pin P (FIGS. 6, 7), and the guide distal end portion includes an opening 20d that is configured to receive the tow bar 30 therein. Embodiments of the present invention are not limited to the illustrated tubular configuration of the guide 20. The guide 20 may have various shapes and configurations suitable to allow the tow bar 30 to be extended and retracted therefrom.

One or more interior surfaces of the guide 20 may include a coating or layer of bearing material that facilitates sliding of the tow bar 30 as it is being extended from and retracted into the guide 20. In some embodiments, one or more surfaces of the tow bar 30 may include a coating or layer of bearing material that facilitates sliding of the tow bar 30 as it is being extended from and retracted into the guide 20. In some embodiments of the present invention, the bearing material utilized in the guide 20 and/or on the tow bar 30 may have a coefficient of friction of about 0.5 or less.

An exemplary bearing material that may be utilized in accordance with embodiments of the present invention is NYLATRON® brand bearing material. NYLATRON® brand bearing material has numerous properties that are particularly suitable for the hitch apparatus 10. For example, NYLATRON® brand bearing material has high mechanical strength, stiffness, hardness, and toughness. In addition, NYLATRON® brand bearing material exhibits good fatigue resistance, high mechanical damping ability, good sliding properties, and good wear resistance. However, various other types of bearing materials may be utilized with embodiments of the present invention, without limitation.

The illustrated tow bar 30 is a tubular member having a proximal end portion 30a and a distal end portion 30b connected by a center or medial portion 30c. The tow bar distal end portion 30b includes an opening 32 that is configured to receive a coupling apparatus 34, such as a ball coupler, a pintle hook, a spring cushioned pintle hook, a swivel pintle hook, a lunette ring, a clevis pin attachment, etc. A clevis pin 34a and hairpin locking device 34b may be utilized to removably secure the coupling apparatus 34 to the tow bar distal end 30b, as would be understood by those skilled in the art of the present invention. In FIGS. 6, 7, 9 and 10, the illustrated coupling apparatus 34 is a spring cushioned pintle hook. In some embodiments, the tow bar distal end portion 30b may include a coupling apparatus 34 integrally formed therewith.

Embodiments of the present invention are not limited to the illustrated rectangular tubular configuration of the tow bar 30. Other configurations may be utilized. For example, in some embodiments, the tow bar 30 may have other tubular cross-sectional shapes. Furthermore, in other embodiments, the tow bar 30 may be a solid member or plate.

The illustrated hitch apparatus 10 also includes a user controlled positioning system that is configured to position the tow bar distal end 30b, and particularly a coupling apparatus secured thereto, at a desired position within a three-dimensional coordinate system (i.e., three-dimensional movement within x-y-z space). The positioning system includes a plurality of actuators 50, 60, 70 and a user input device 40 that is operably associated with the actuators 50, 60, 70 and that allows a user to pivot the frame upper portion 12a about the first axis $A_1$, pivot the guide 20 about the second axis $A_2$, and extend and retract the tow bar 30 relative to the guide 20. In the illustrated embodiment a pair of actuators 50 are configured to pivot the frame about the first axis $A_1$ and, thereby, raise and lower the tow bar distal end 30b. Each one of the actuators 50 is positioned on a respective side of the guide, as illustrated. In some embodiments of the present invention, a single actuator 50 may be sufficient to pivot the frame about the first axis $A_1$ and, thereby, raise and lower the tow bar distal end 30b.

Each actuator 50 includes a proximal end portion 50a secured to the frame lower portion 12b and an opposite distal end portion 50b that is secured to a frame member 12m, as illustrated. In embodiments of the present invention where a lower frame portion 12b is not utilized, the proximal end portion 50a of each actuator 50 may be secured to the chassis of a vehicle. Moreover, in some embodiments of the present invention, the proximal end portions 50a of the actuators 50 may be secured to a portion of a vehicle above the upper frame portion 12a and extend downwardly to the frame upper portion 12a, as illustrated in FIGS. 11A-11C.

In some embodiments of the present invention, a locking mechanism 110 (FIG. 4) may be utilized to secure the upper frame portion 12a in a tow position and to prevent the upper frame portion 12a from rotating about the first axis $A_1$, both upward rotation and downward rotation. For example, such a locking mechanism may be used in embodiments of the present invention where a lower frame portion 12b is not utilized (e.g., FIGS. 11A-11C). The illustrated locking mechanism 110 includes at least one pin 112, or other such member, that can releasably engage (e.g., slidably engage, etc.) a frame member 12m to secure the upper frame portion 12a in a tow position. The at least one pin 112 is operably associated with a rigid portion of a vehicle, such as a vehicle chassis, as would be understood by those skilled in the art. Embodiments of the present invention are not limited to the illustrated locking mechanism 110. Various ways of locking the upper frame portion 12a in a tow position may be utilized without limitation. The locking mechanism 110 may be manually operated, for example, via a handle. In other embodiments of the present invention, the locking mechanism 110 may be automatically controlled (e.g., electrically controlled, hydraulically controlled, pneumatically controlled, etc.). For example, in some embodiments, the locking mechanism 110 may be controlled via the same user control system that is utilized to control operation of the actuators 50, 60, 70.

In the illustrated embodiment, the actuators 50 are hydraulic linear actuators having respective cylinder bodies 52 and cylinder rods 54. Hydraulic fluid from the hydraulic system 80 (FIG. 2) of a vehicle is utilized to extend and retract the cylinder rods 54 relative to the cylinder bodies 52, as would be understood by those of skill in the art of the present invention. In alternative embodiments, one or both of the actuators 50 may be other types of actuators, such as electric actuators, pneumatic actuators, mechanical actuators, link systems or other components known to those of ordinary skill in the art for coordinating movement of components relative to one another.

The illustrated actuator 60 is configured to pivot the guide 20 about the second axis $A_2$ and to provide lateral movement for the tow bar distal end 30b. The actuator 60 includes a proximal end portion 60a attached to a frame member 12m and an opposite distal end portion 60b secured to the guide medial portion 20c. In some embodiments of the present invention, more than one actuator 60 may be utilized to pivot the guide about the second axis $A_2$. In the illustrated embodiment, the actuator 60 is a hydraulic linear actuator having a cylinder body 62 and cylinder rod 64. Hydraulic fluid from the hydraulic system 80 (FIG. 2) of a vehicle is utilized to extend and retract the cylinder rod 64 relative to the cylinder body 62, as would understood by those of skill in the art of the present invention. In alternative embodiments, the actuator 60 may be another type of actuator, such as an electric actuator, pneumatic actuator, mechanical actuator, link system or other components known to those of ordinary skill in the art for coordinating movement of components relative to one another.

The illustrated actuator 70 is located within the guide 20 and is configured to extend and retract the tow bar 30 relative to the guide 20. The actuator 70 includes a proximal end portion 70a secured to the guide 20 and an opposite distal end portion 70b secured to the proximal end portion 30a of the tow bar 30. In the illustrated embodiment, the actuator 70 is a hydraulic linear actuator having a cylinder body 72 and cylinder rod 74. Hydraulic fluid from the hydraulic system 80 (FIG. 2) of a vehicle is utilized to extend and retract the cylinder rod 74 relative to the cylinder body 72, as would understood by those of skill in the art of the present invention. In alternative embodiments, the actuator 70 may be another type of actuator, such as an electric actuator, pneumatic actuator, mechanical actuator, link system or other components known to those of ordinary skill in the art for coordinating movement of components relative to one another.

Figure 1:
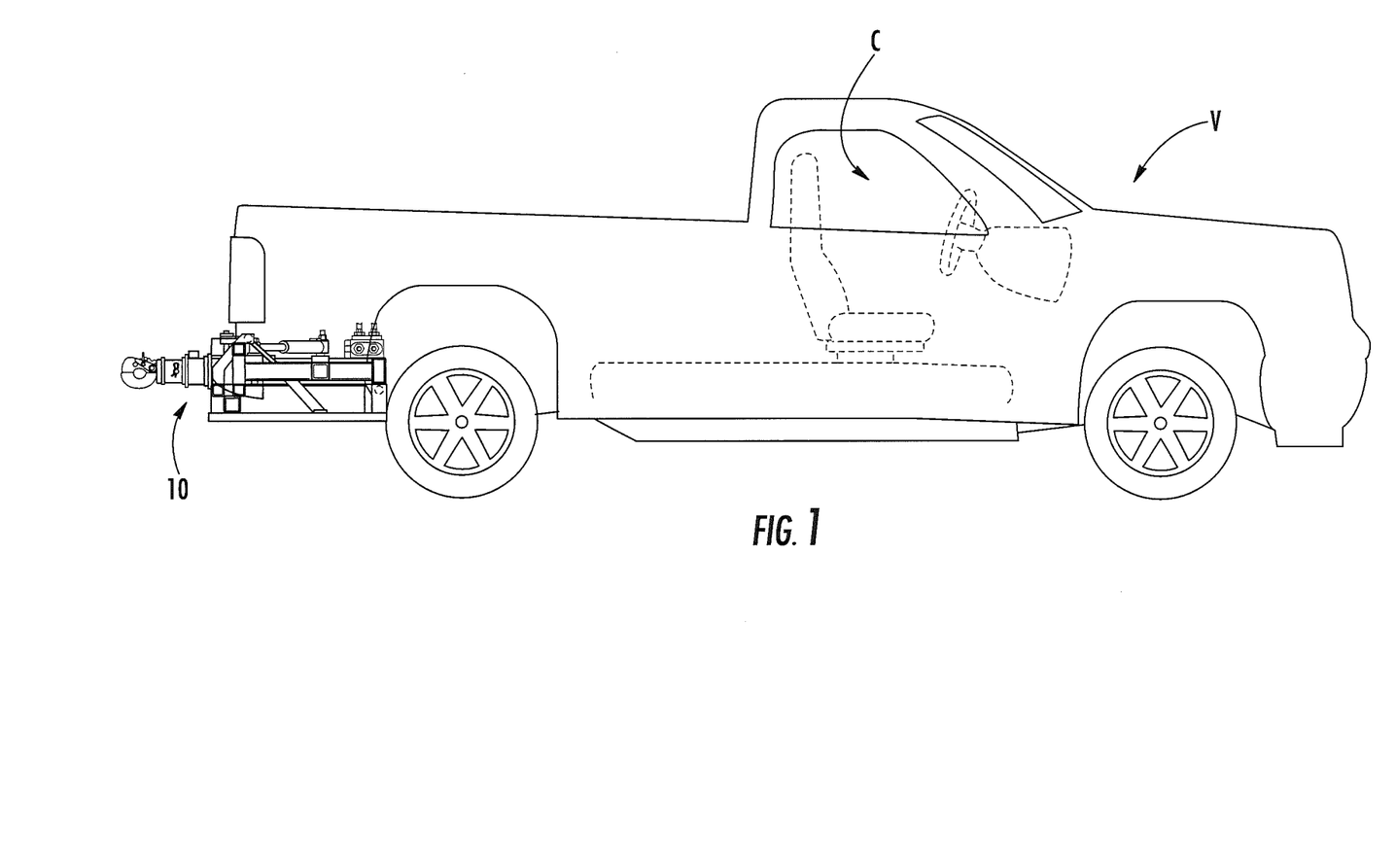
FIG. 1 is a side elevation view of a hitch apparatus mounted to a vehicle, according to some embodiments of the present invention, and with some of the vehicle removed for clarity.
Figure 2:
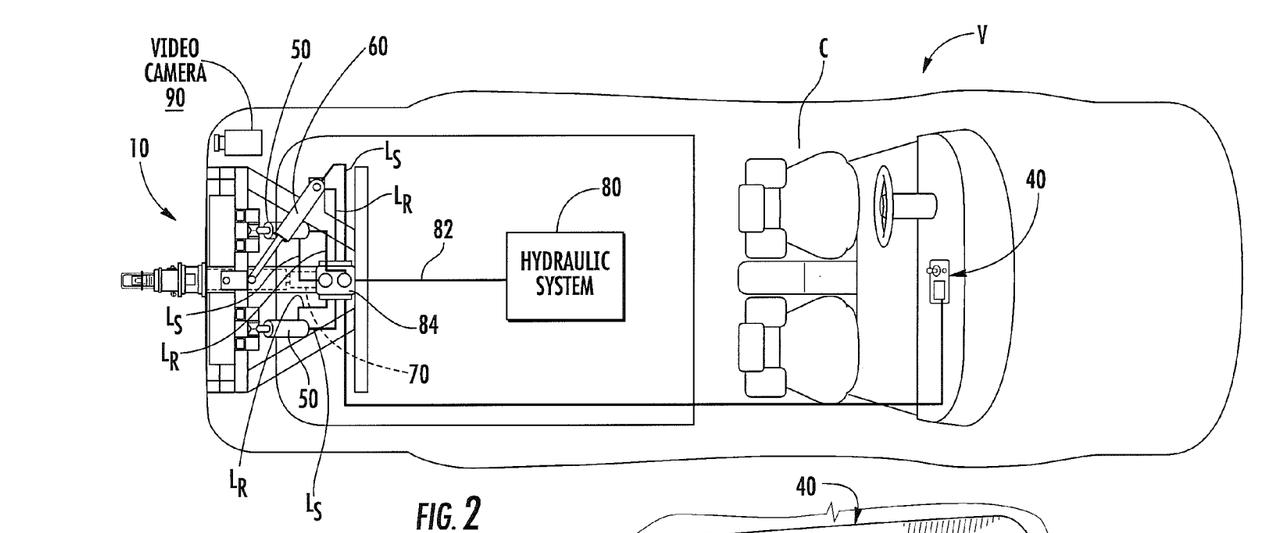
FIG. 2 is a schematic illustration of a hydraulic system utilized to control the hitch apparatus of FIG. 1, according to some embodiments of the present invention.

Referring to FIG. 2, a hydraulic system 80 of a vehicle V is illustrated that may be utilized in the operation of the illustrated actuators 50, 60, 70, according to some embodiments of the present invention. A control valve 84 receives hydraulic fluid under pressure from the hydraulic system 80 and is configured to control the supply and return of the hydraulic fluid to and from the actuators 50, 60, 70 as would be understood by those skilled in the art. For example, each actuator 50, 60, 70 is connected to the control valve 84 via a respective supply line $L_S$ and return line $L_R$. Pressurized hydraulic fluid is supplied to a respective actuator 50, 60, 70 via supply line $L_S$ to cause the cylinder rod 54, 64, 74 to extend outwardly from the cylinder body 52, 62, 72. Hydraulic fluid is returned to the control valve via return line $L_R$ to cause the cylinder rod 54, 64, 74 to retract back into the cylinder body 52, 62, 72. For clarity, in FIGS. 4-7, 8 and 9, only actuator 60 is illustrated with a supply line $L_S$ and a return line $L_R$.

Various types of control valves may be utilized and embodiments of the present invention is not limited to any particular way of controlling the supply and return of hydraulic fluid to the actuators 50, 60, 70. A user input device 40 is operably connected to the control valve 84. The control valve 84 is configured to receive and convert user input (e.g., via user input device 42, FIG. 2, or via user input buttons 40a, 40b, 40c, FIG. 4) into control of the supply and return of hydraulic fluid to the various actuators 50, 60, 70 so as to move the tow bar distal end 30b within a three dimensional space.

Figure 4:
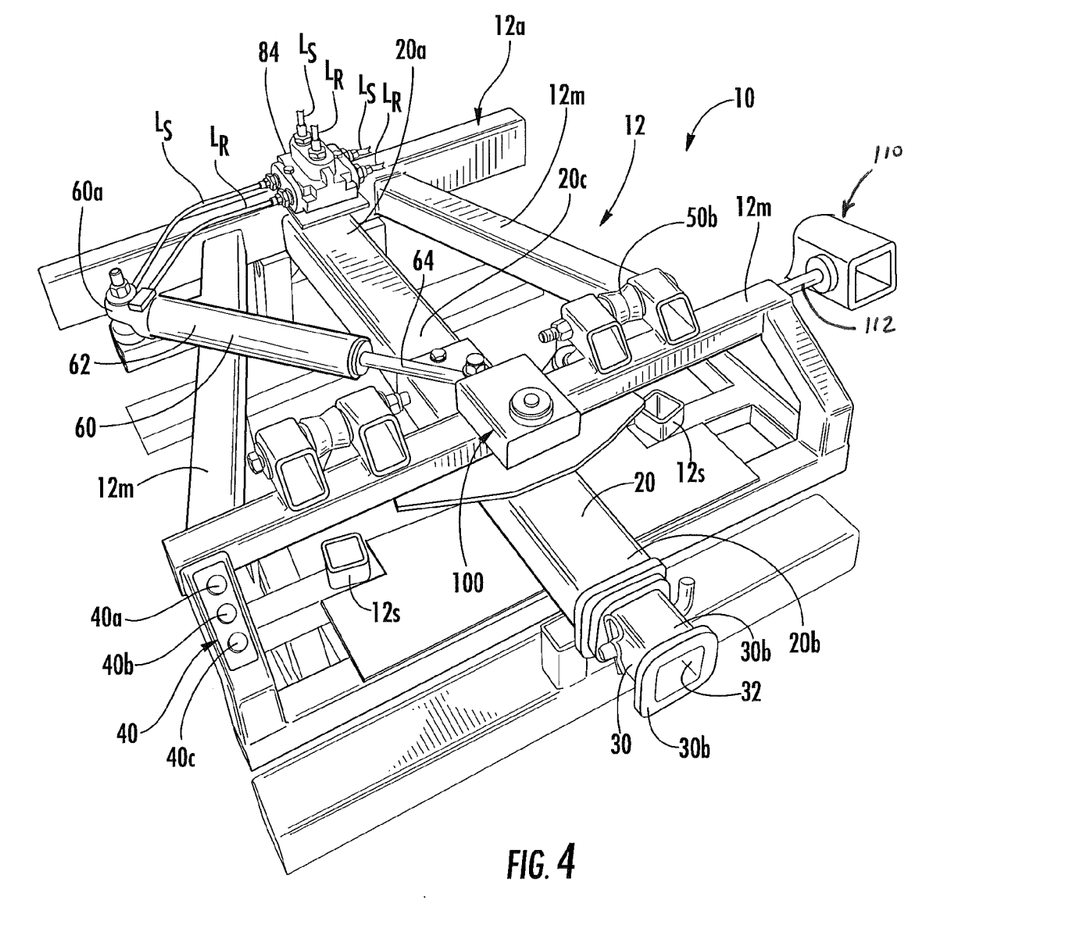
FIG. 4 is a rear perspective view of the hitch apparatus of FIG. 1.
Figure 5:
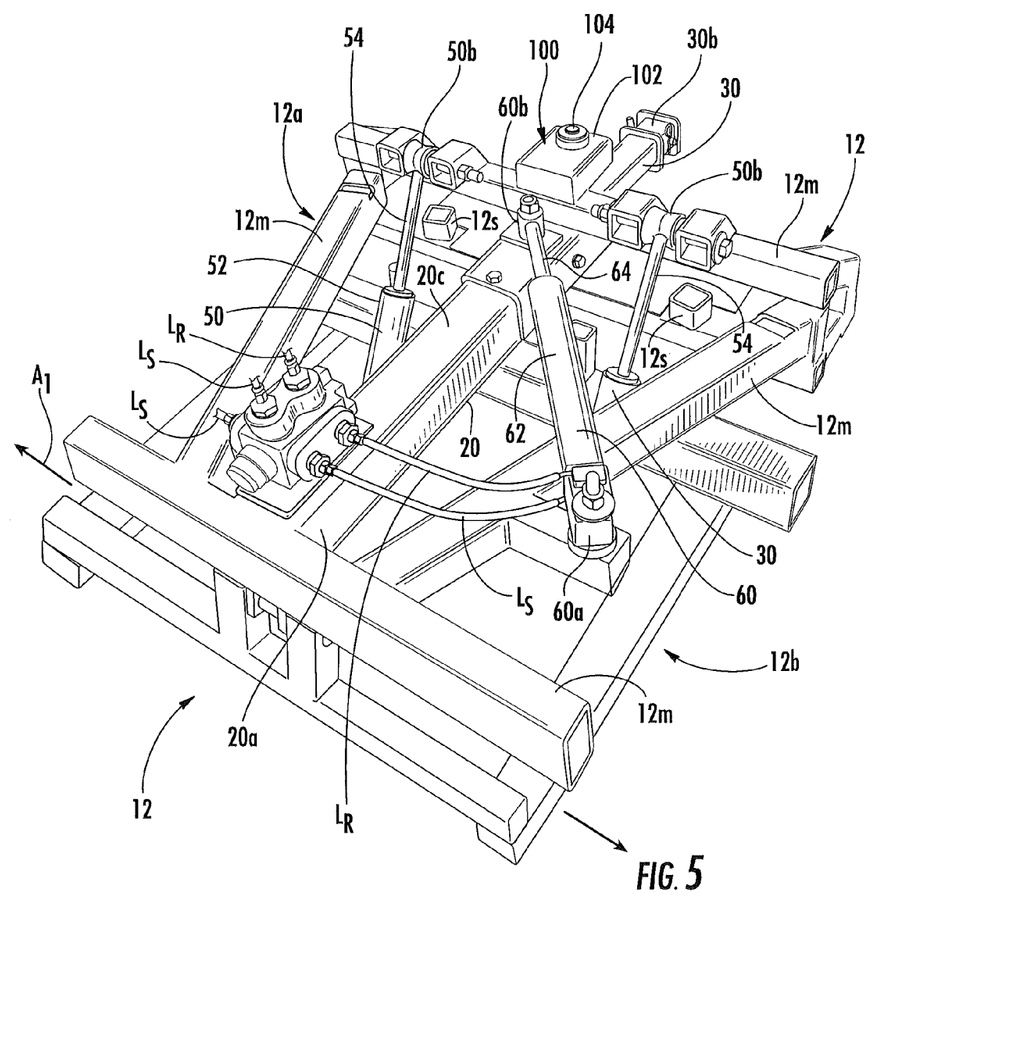
FIG. 5 is a front perspective view of the hitch apparatus of FIG. 1.
Figure 6:
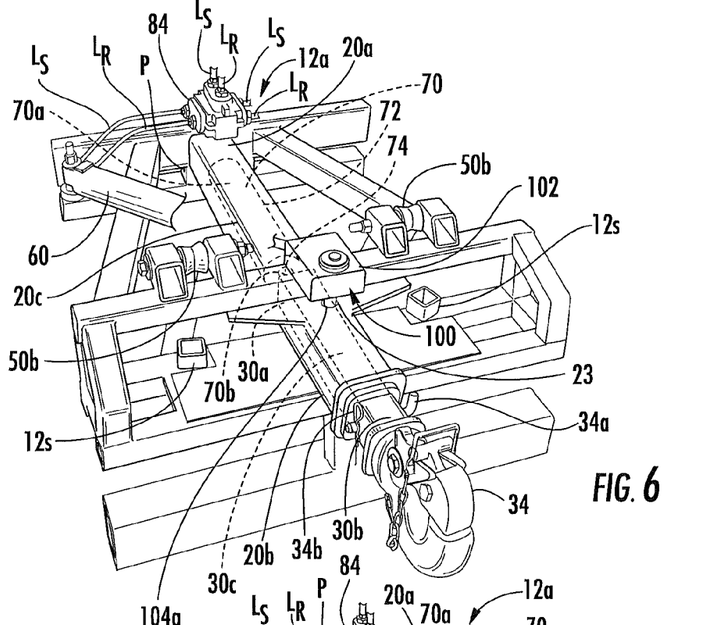
FIG. 6 rear perspective view of the hitch apparatus of FIG. 1 with the tow bar in a fully retracted and centered position.

The user input device 40 may be located near the hitch apparatus 10 in some embodiments (FIG. 4) and may be located remotely from the hitch apparatus 10 in other embodiments (FIG. 2). In the embodiment of FIG. 4, the user input device 40 is located on the upper frame 12a of the hitch apparatus 10. The user input device 40 includes a respective button 40a, 40b, 40c for controlling respective actuators 50, 60, 70.

Figure 3:
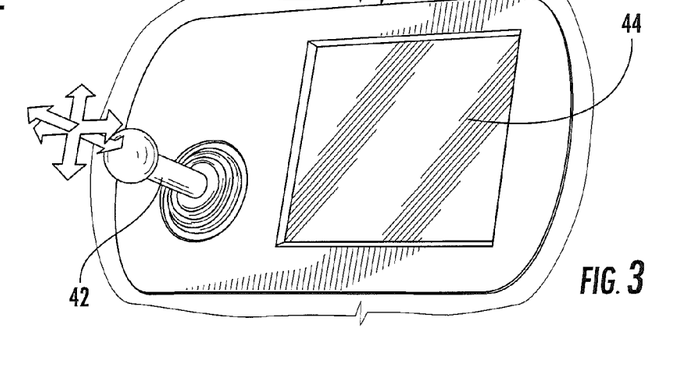
FIG. 3 is an enlarged perspective view of a user input device and display that may be utilized to operate the hitch apparatus of FIG. 1, according to some embodiments of the present invention.

In the embodiment of FIGS. 2 and 3, the user input device 40 is located remotely from the hitch apparatus 10. The user input device is located in the vehicle operator cabin C. The illustrated user input device 40 includes a control mechanism 42, such as a joystick, and a display screen 44 that allow a vehicle operator to control movement of the tow bar distal end 30b from within the vehicle cabin C.

In some embodiments of the present invention, an alignment system, such as that described in co-pending and co-owned U.S. patent application Ser. No. 13/354,928, filed Jan. 20, 2012, and which is incorporated herein by reference in its entirety, may be utilized with hitch apparatus 10. For example, an alignment system may include at least one energy emitter secured to a vehicle that emits energy in the direction of a trailer tongue, and at least two sensors secured to the vehicle in spaced-apart relationship. Each sensor is configured to generate signals in response to detecting a reflection of the emitted energy from the trailer tongue. The energy emitter may be, for example, an optical emitter, an infrared emitter, an acoustic emitter, or an ultrasound emitter, and the sensors may be optical sensors, infrared sensors, acoustic sensors, or ultrasound sensors, respectively. In some embodiments, a separate energy emitter is not utilized. Instead, a pair of transducers (e.g., optical or acoustic transducers) are utilized, each of which emits energy in the direction of the trailer tongue and generates signals in response to detecting a reflection of the energy from the trailer tongue. In some embodiments of the present invention, three or more transducers may be utilized.

A processor is in communication with the sensors and processes the signals generated by the sensors to provide directional data representative of a location of the trailer tongue relative to a target zone that represents a location of the tow bar distal end 30b and, more specifically, a coupling apparatus 34 located at the tow bar distal end 30b. The processor displays a representation of a location of the trailer tongue relative to the target zone within a user interface displayed in display screen 44. The user can manipulate the tow bar distal end 30b via the joystick 42 to engage or come close to the trailer tongue and can view such motion via the display.

In other embodiments of the present invention, the positioning system includes a video camera 90 located at the rear of the vehicle V for capturing video images, wherein the video camera has a field of view that at least encompasses the distal end 30b of the tow bar 30. The display 44 displays video images captured by the video camera 90 and allows a user to view manipulation of the tow bar distal end 30 relative to a trailer tongue. In some embodiments of the present invention, the video camera 90 may be a back-up camera already provided with a vehicle.

Figure 7:
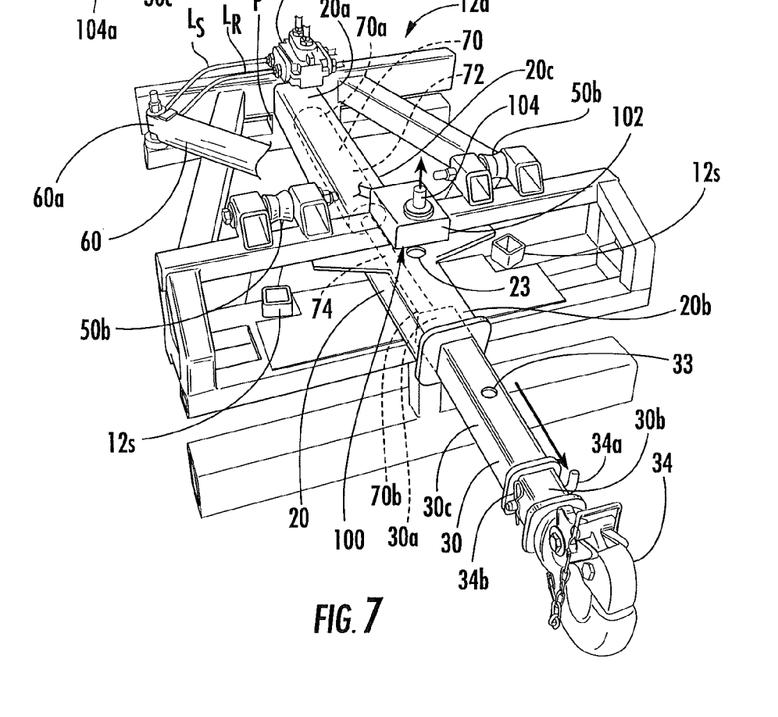
FIG. 7 is a rear perspective view of the hitch apparatus of FIG. 1 with the tow bar in an extended position.

The illustrated hitch apparatus also includes a locking mechanism 100 that is operably secured to the frame upper portion 12a that releasably engages the tow bar 30 to maintain the tow bar 30 in a retracted position. The illustrated locking mechanism 100 includes a housing 102 and a locking member 104 movably secured within the housing 102. The locking member 104 is movable between a position wherein a free end 104a (FIG. 6) of the locking member 104 is inserted through an opening 23 in the guide 20 and a corresponding opening 33 in the tow bar 30 to maintain the tow bar 30 in a fully retracted position, and a position wherein the locking member free end 104a is disengaged from the tow bar opening 33 (FIG. 7). The locking member 104 may be manually operated, for example, via a handle. In other embodiments of the present invention, the locking member 104 may be automatically controlled (e.g., electrically controlled, hydraulically controlled, pneumatically controlled, etc.). For example, in some embodiments, the locking member 104 may be controlled via the same user control system that is utilized to control operation of the actuators 50, 60, 70.

Figure 8:
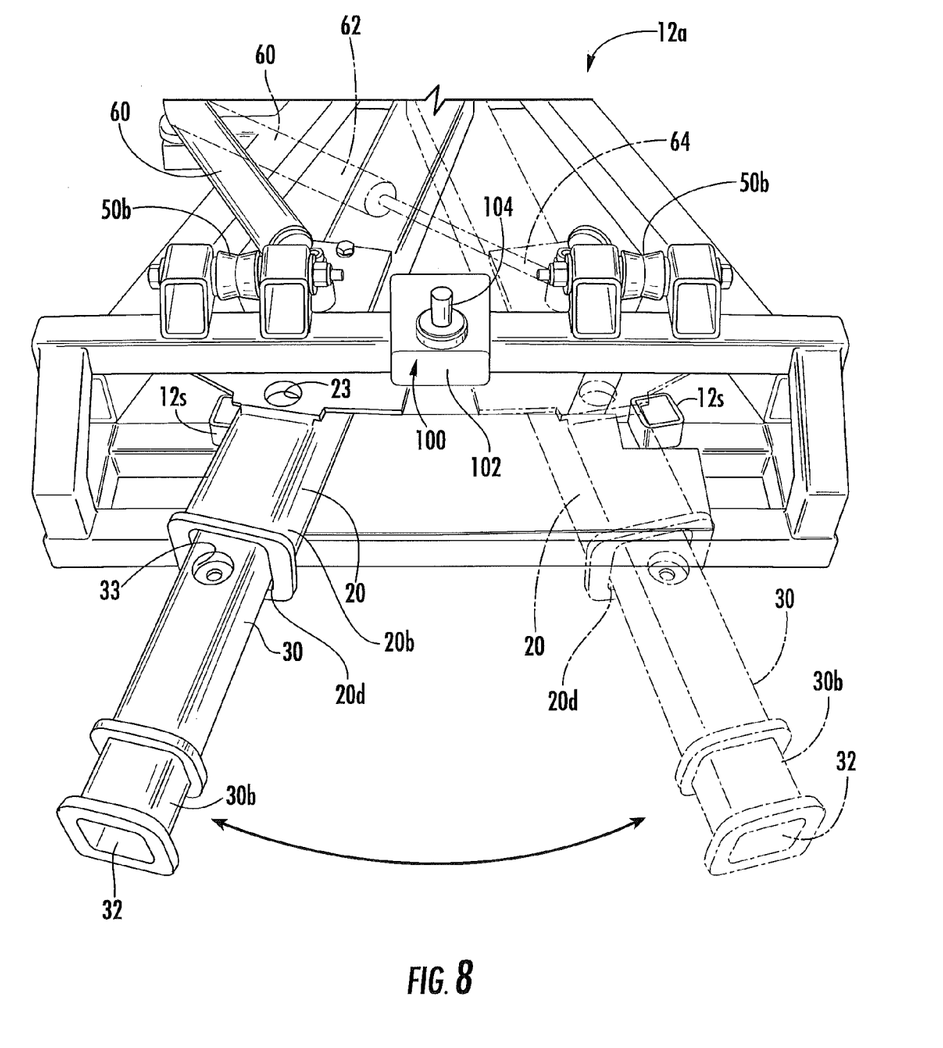
FIG. 8 is a rear perspective view of the hitch apparatus of FIG. 1 that illustrates lateral movement of the tow bar.
Figure 9:
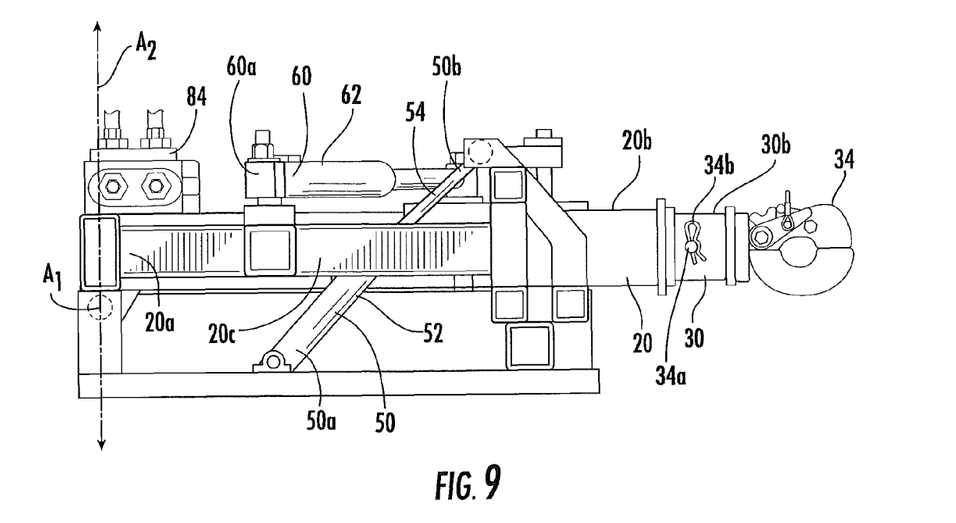
FIG. 9 is a side elevation view of the hitch apparatus of FIG. 1 with the tow bar in a fully retracted position.
Figure 10:
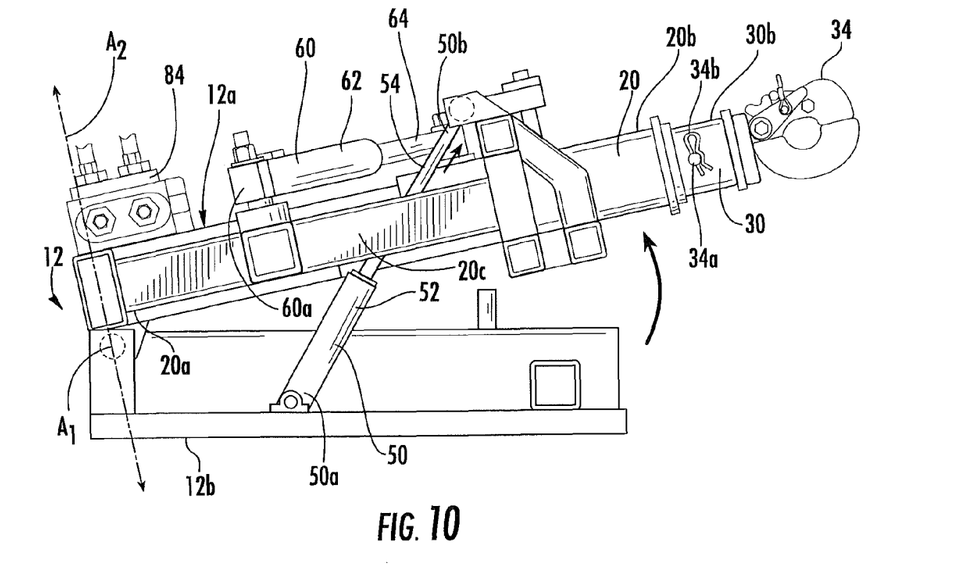
FIG. 10 is a side elevation view of the hitch apparatus of FIG. 1 with the tow bar in an elevated position.
Figure 11A:
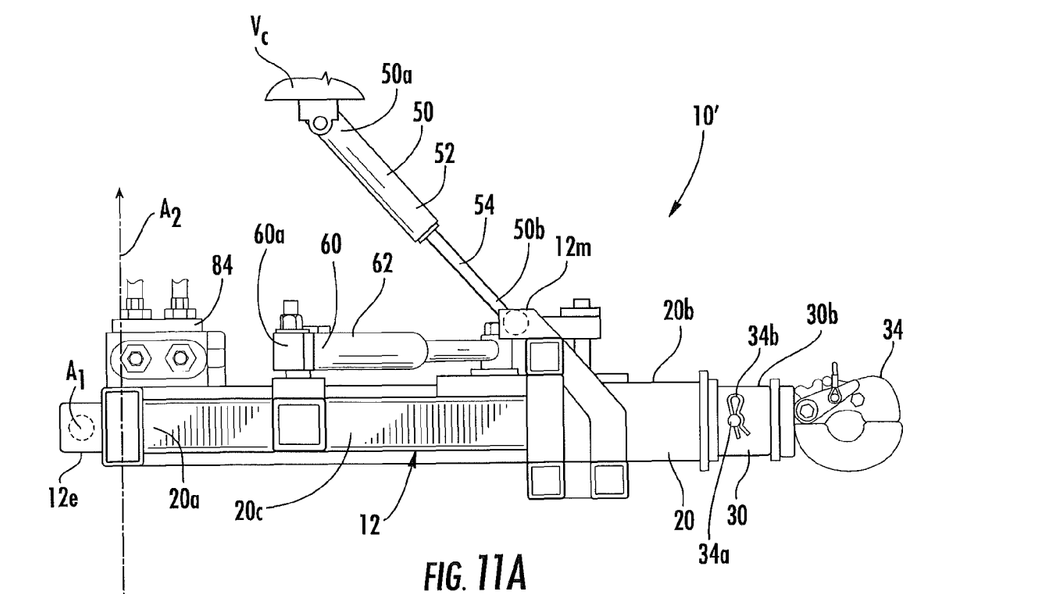
FIGS. 11A-11C are side elevation views of a hitch apparatus, according to some embodiments of the present invention.
Figure 11B:
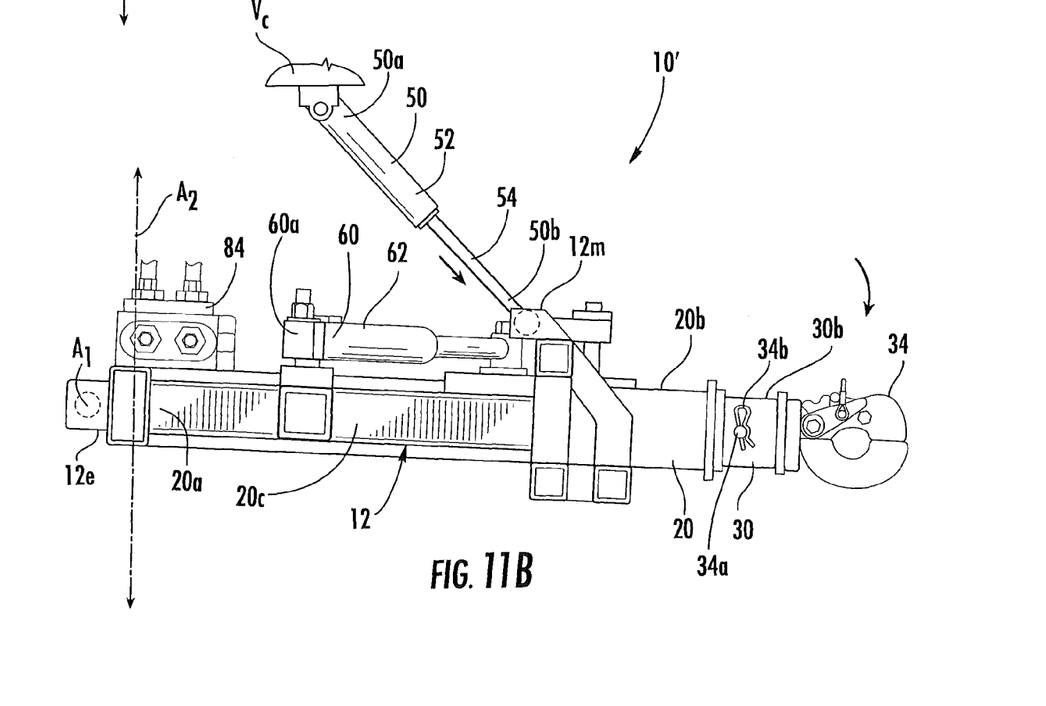
Figure 11C:
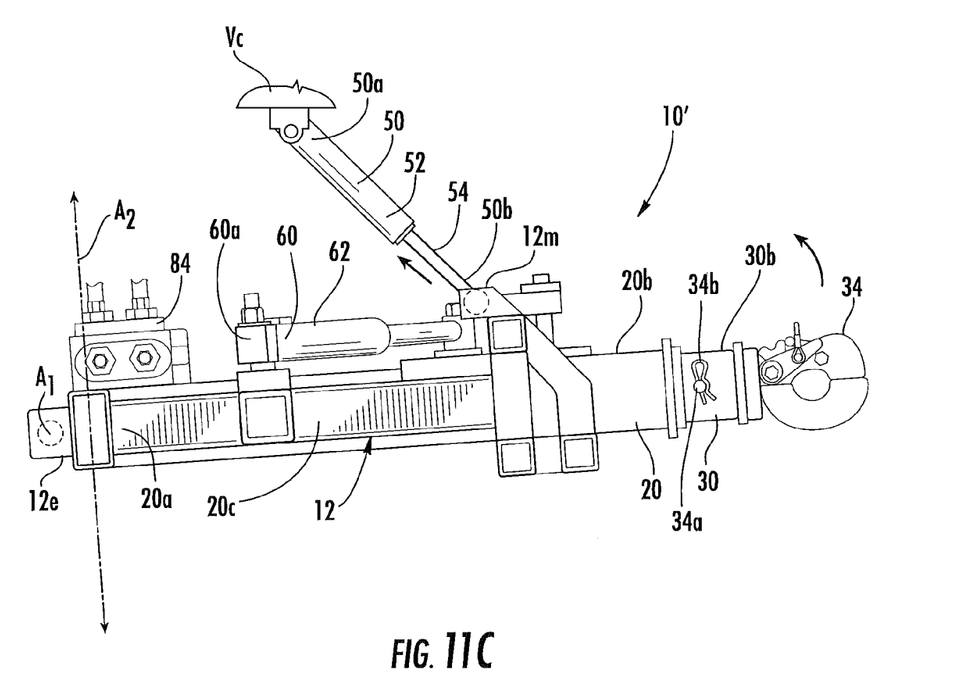

FIGS. 7, 8 and 10 illustrate movement of the tow bar 30. For example, FIG. 7 illustrates actuator 70 extending the tow bar 30 from the guide 20. FIG. 8 illustrates actuator 60 pivoting the guide 20 horizontally between the stops 12s. FIG. 10 illustrates actuators 50 pivoting the frame upper portion 12a, along with the guide 20 and tow bar 30, upwardly.

FIGS. 11A-11C are side elevation views of a hitch apparatus 10', according to some embodiments of the present invention, that does not include the frame lower portion 12b of the hitch apparatus 10 of FIGS. 1, 2 and 4-10. In the illustrated embodiment of FIG. 11A-11C, the frame 12 is movably secured to a vehicle chassis (not illustrated) via one or more frame elements 12e so as to be pivotable about a first axis $A_1$. One or more actuators 50 are configured to pivot the frame about the first axis $A_1$ and, thereby, raise (FIG. 11C) and lower (FIG. 11B) the tow bar distal end 30b. Each of the one or more actuators 50 includes a proximal end portion 50a secured to a vehicle chassis $V_C$ and an opposite distal end portion 50b that is secured to a frame member 12m, as illustrated.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A hitch apparatus, comprising:
  a frame configured to be pivotably secured to a vehicle, wherein the frame is pivotable about a first axis;
  a guide pivotably secured to the frame and pivotable about a second axis that is substantially transverse to the first axis;
  a tow bar movably secured to the guide and movable relative to the guide between retracted and extended positions, wherein the tow bar comprises a distal end, and wherein the tow bar comprises a receiver tube having an open distal end configured to removably receive a coupling apparatus therein; and
  a user controlled positioning system configured to position the tow bar distal end at a desired position within a three-dimensional coordinate system.

2. The hitch apparatus of claim 1, wherein the positioning system comprises:
  at least one first actuator configured to pivot the frame about the first axis;
  a second actuator configured to pivot the guide about the second axis; and
  a third actuator configured to extend and retract the tow bar relative to the guide,
  wherein the first, second and third actuators are hydraulic actuators, electrical actuators, or pneumatic actuators.

3. The hitch apparatus of claim 1, wherein the frame has opposite first and second end portions, and wherein the frame first end portion is configured to be pivotably secured to the vehicle.

4. The hitch apparatus of claim 1, wherein the guide comprises an elongated tube, and wherein the third actuator is positioned within the tube.

5. The hitch apparatus of claim 1, wherein the at least one first actuator comprises a pair of first actuators in spaced-apart relationship.

6. The hitch apparatus of claim 5, wherein the guide is positioned between the pair of first actuators.

7. The hitch apparatus of claim 1, wherein the distal end of the tow bar is configured to removably receive a ball coupler, a pintle hook, a cushioned pintle hook, a swivel pintle hook, a lunette ring, or a clevis pin attachment.

8. The hitch apparatus of claim 1, wherein the open distal end of the receiver tube is configured to removably receive a ball coupler, a pintle hook, a cushioned pintle hook, a swivel pintle hook, a lunette ring, or a clevis pin attachment.

9. The hitch apparatus of claim 1, wherein the positioning system comprises a user input device that allows a user to pivot the frame about the first axis, pivot the guide about the second axis, and extend and retract the tow bar relative to the guide.

10. The hitch apparatus of claim 1, wherein the positioning system comprises a user interface configured to display a representation of a location of the distal end of the tow bar relative to a towed vehicle.

11. The hitch apparatus of claim 1, wherein the positioning system comprises a video camera for capturing video images, wherein the video camera has a field of view that at least encompasses the distal end of the tow bar, and a video display operable to display video images captured by the video camera.

12. The hitch apparatus of claim 1, further comprising a locking mechanism operably secured to the frame that releasably engages the tow bar to maintain the tow bar in a retracted position.

13. The hitch apparatus of claim 1, wherein the frame comprises spaced-apart stops that limit an extent to which the guide can pivot about the second axis.

14. A vehicle, comprising:
  a chassis;
  a body mounted on the chassis, the body including a cabin for an operator of the vehicle; and
  a hitch apparatus, comprising:
    a frame configured to be pivotably secured to the chassis, wherein the frame is pivotable relative to the chassis about a first axis;
    a guide pivotably secured to the frame and pivotable about a second axis that is substantially transverse to the first axis;
    a tow bar movably secured to the guide and movable relative to the guide between retracted and extended positions, wherein the tow bar comprises a distal end; and a user controlled positioning system configured to position the tow bar distal end at a desired position within a three-dimensional coordinate system, wherein the positioning system comprises a user interface configured to display a representation of a location of the distal end of the tow bar relative to a towed vehicle.

15. The vehicle of claim 14, wherein the positioning system comprises:
a first actuator configured to pivot the frame about the first axis;
a second actuator configured to pivot the guide about the second axis; and
a third actuator configured to extend and retract the tow bar relative to the guide,
wherein the first, second and third actuators are hydraulic actuators, electrical actuators, or pneumatic actuators.

16. The vehicle of claim 14, wherein the distal end of the tow bar is configured to removably receive a ball coupler, a pintle hook, a cushioned pintle hook, a swivel pintle hook, a lunette ring, or a clevis pin attachment.

17. The vehicle of claim 14, wherein the positioning system comprises a user input device that allows a user to pivot the frame about the first axis, pivot the guide about the second axis, and extend and retract the tow bar relative to the guide.

18. A hitch apparatus, comprising:
a frame configured to be pivotably secured to a vehicle, wherein the frame is pivotable about an axis, and wherein the frame comprises a guide;
a tow bar movably secured to the guide and movable relative to the guide between retracted and extended positions, wherein the tow bar comprises a distal end, and wherein the tow bar comprises a receiver tube having an open distal end configured to removably receive a coupling apparatus therein; and
a user controlled positioning system configured to position the tow bar distal end at a desired position within a three-dimensional coordinate system.

19. The hitch apparatus of claim 18, wherein the positioning system comprises:
a first actuator configured to pivot the frame about the axis; and
a second actuator configured to extend and retract the tow bar relative to the guide,
wherein the first and second actuators are hydraulic actuators, electrical actuators, or pneumatic actuators.

20. The hitch apparatus of claim 18, wherein the distal end of the tow bar is configured to removably receive a ball coupler, a pintle hook, a cushioned pintle hook, a swivel pintle hook, a lunette ring, or a clevis pin attachment.

21. The hitch apparatus of claim 18, wherein the open distal end of the receiver tube is configured to removably receive a ball coupler, a pintle hook, a cushioned pintle hook, a swivel pintle hook, a lunette ring, or a clevis pin attachment.

22. The hitch apparatus of claim 18, wherein the positioning system comprises a user input device that allows a user to pivot the frame about the axis, and extend and retract the tow bar relative to the guide.

23. The hitch apparatus of claim 18, wherein the positioning system comprises a user interface configured to display a representation of a location of the distal end of the tow bar relative to a towed vehicle.

24. The hitch apparatus of claim 18, wherein the positioning system comprises a video camera for capturing video images, wherein the video camera has a field of view that at least encompasses the distal end of the tow bar, and a video display operable to display video images captured by the video camera.

25. The hitch apparatus of claim 18, further comprising a locking mechanism operably secured to the frame that releasably engages the tow bar to maintain the tow bar in a retracted position.

26. A vehicle, comprising:
a chassis;
a body mounted on the chassis, the body including a cabin for an operator of the vehicle; and
a hitch apparatus, comprising:
a frame configured to be pivotably secured to the chassis, wherein the frame is pivotable relative to the chassis about an axis, and wherein the frame comprises a guide;
a tow bar movably secured to the guide and movable relative to the guide between retracted and extended positions, wherein the tow bar comprises a distal end; and
a user controlled positioning system configured to position the tow bar distal end at a desired position within a three-dimensional coordinate system, wherein the positioning system comprises a user interface configured to display a representation of a location of the distal end of the tow bar relative to a towed vehicle.

27. The vehicle of claim 26, wherein the positioning system comprises:
a first actuator configured to pivot the frame about the axis; and
a second actuator configured to extend and retract the tow bar relative to the guide,
wherein the first and second actuators are hydraulic actuators, electrical actuators, or pneumatic actuators.

28. The vehicle of claim 26, wherein the distal end of the tow bar is configured to removably receive a ball coupler, a pintle hook, a cushioned pintle hook, a swivel pintle hook, a lunette ring, or a clevis pin attachment.

29. The vehicle of claim 26, wherein the positioning system comprises a user input device that allows a user to pivot the frame about the axis, and extend and retract the tow bar relative to the guide.

30. A hitch apparatus, comprising:
a frame configured to be pivotably secured to a vehicle, wherein the frame is pivotable about a first axis;
a guide pivotably secured to the frame and pivotable about a second axis that is substantially transverse to the first axis;
a tow bar movably secured to the guide and movable relative to the guide between retracted and extended positions, wherein the tow bar comprises a distal end; and
a user controlled positioning system configured to position the tow bar distal end at a desired position within a three-dimensional coordinate system, wherein the positioning system comprises a user interface configured to display a representation of a location of the distal end of the tow bar relative to a towed vehicle.

31. A hitch apparatus, comprising:
a frame configured to be pivotably secured to a vehicle, wherein the frame is pivotable about a first axis;
a guide pivotably secured to the frame and pivotable about a second axis that is substantially transverse to the first axis;
a tow bar movably secured to the guide and movable relative to the guide between retracted and extended positions, wherein the tow bar comprises a distal end; and
a user controlled positioning system configured to position the tow bar distal end at a desired position within a three-dimensional coordinate system, wherein the positioning system comprises a video camera for capturing video images, wherein the video camera has a field of view that at least encompasses the distal end of the tow bar, and a video display operable to display video images captured by the video camera.

32. A hitch apparatus, comprising:
a frame configured to be pivotably secured to a vehicle, wherein the frame is pivotable about a first axis;
a guide pivotably secured to the frame and pivotable about a second axis that is substantially transverse to the first axis;
a tow bar movably secured to the guide and movable relative to the guide between retracted and extended positions, wherein the tow bar comprises a distal end; and
a user controlled positioning system configured to position the tow bar distal end at a desired position within a three-dimensional coordinate system,
wherein the frame comprises spaced-apart stops that limit an extent to which the guide can pivot about the second axis.

33. A vehicle, comprising:
a chassis;
a body mounted on the chassis, the body including a cabin for an operator of the vehicle; and
a hitch apparatus, comprising:
a frame configured to be pivotably secured to the chassis, wherein the frame is pivotable relative to the chassis about a first axis;
a guide pivotably secured to the frame and pivotable about a second axis that is substantially transverse to the first axis;
a tow bar movably secured to the guide and movable relative to the guide between retracted and extended positions, wherein the tow bar comprises a distal end; and
a user controlled positioning system configured to position the tow bar distal end, at a desired position within a three-dimensional coordinate system, wherein the positioning system comprises a video camera for capturing video images, wherein the video camera has a field of view that at least encompasses the distal end of the tow bar, and a video display operable to display video images captured by the video camera.

34. A hitch apparatus, comprising:
a frame configured to be pivotably secured to a vehicle, wherein the frame is pivotable about an axis, and wherein the frame comprises a guide;
a tow bar movably secured to the guide and movable relative to the guide between retracted and extended positions, wherein the tow bar comprises a distal end; and
a user controlled positioning system configured to position the tow bar distal end at a desired position within a three-dimensional coordinate system, wherein the positioning system comprises a user interface configured to display a representation of a location of the distal end of the tow bar relative to a towed vehicle.

35. A hitch apparatus, comprising:
a frame configured to be pivotably secured to a vehicle, wherein the frame is pivotable about an axis, and wherein the frame comprises a guide;
a tow bar movably secured to the guide and movable relative to the guide between retracted and extended positions, wherein the tow bar comprises a distal end; and
a user controlled positioning system configured to position the tow bar distal end at a desired position within a three-dimensional coordinate system, wherein the positioning system comprises a video camera for capturing video images, wherein the video camera has a field of view that at least encompasses the distal end of the tow bar, and a video display operable to display video images captured by the video camera.

36. A vehicle, comprising:
a chassis;
a body mounted on the chassis, the body including a cabin for an operator of the vehicle; and
a hitch apparatus, comprising:
a frame configured to be pivotably secured to the chassis, wherein the frame is pivotable relative to the chassis about an axis, and wherein the frame comprises a guide;
a tow bar movably secured to the guide and movable relative to the guide between retracted and extended positions, wherein the tow bar comprises a distal end; and
a user controlled positioning system configured to position the tow bar distal end at a desired position within a three-dimensional coordinate system, wherein the positioning system comprises a video camera for capturing video images, wherein the video camera has a field of view that at least encompasses the distal end of the tow bar, and a video display operable to display video images captured by the video camera.

* * * * *

UNITED STATES PATENT AND TRADEMARK OFFICE
CERTIFICATE OF CORRECTION

| | | |
|---|---|---|
| PATENT NO. | : 8,678,421 B1 | Page 1 of 1 |
| APPLICATION NO. | : 13/646355 | |
| DATED | : March 25, 2014 | |
| INVENTOR(S) | : Williams, Jr. et al. | |

It is certified that error appears in the above-identified patent and that said Letters Patent is hereby corrected as shown below:

In the Claims:
Column 13, Claim 33, Line 34: Correct "tow bar distal end, at a"
to read -- tow bar distal end at a --

Signed and Sealed this
Seventh Day of October, 2014

Michelle K. Lee
*Deputy Director of the United States Patent and Trademark Office*